Feb. 24, 1959 E. M. REIBACK 2,875,282

BINAURAL PHONOGRAPH PICKUP

Filed Oct. 6, 1953

INVENTOR.
EARL M. REIBACK
BY
Morton Amster
ATTORNEY

United States Patent Office 2,875,282
Patented Feb. 24, 1959

2,875,282

BINAURAL PHONOGRAPH PICKUP

Earl M. Reiback, Brooklyn, N. Y.

Application October 6, 1953, Serial No. 384,476
9 Claims. (Cl. 179—100.41)

My invention relates to vibration translating devices, and in particular to phonograph pickups capable of reproducing binaural sound. It is within the contemplation of my invention to provide a binaural phonograph pickup which employs a single stylus to reproduce binaural sound. This single stylus tracks on a record which has a single groove, cut in both a lateral and vertical or hill and dale fashion.

In the past, binaural phonograph pickups have been used which employ two styli mounted laterally, which track in two separate parallel grooves to reproduce binaural sound. This use of two grooves and two styli leads to difficulties in the synchronization of the sound tracks, and to tracking problems. In addition, the use of two separate grooves allows only half as much recording time on a single record which reduces the long playing time of modern high-fidelity records.

Accordingly, it is an object of my invention to provide an arrangement of components to translate into the corresponding electrical variations the mechanical vibrations caused in a tracking stylus by a record groove cut in the following manner:

One output signal causes a single cutting stylus to cut a groove in the conventional, lateral manner. A second, independent output signal causes the same stylus to cut the same groove in a vertical or hill and dale manner. The resultant groove will have a cut whose modulation will be the resultant sum of the two independent modulations impressed.

Another object of my invention is to provide a phonograph pickup of the electromagnetic type which will cause the vibration induced in the pickup stylus by the resultant groove described above to be translated into two separate modulated electric currents, each of which will have a modulation corresponding to either the lateral component of the groove, or the vertical component of the groove. Thus the output current of the pickup will not be the resultant sum of the two modulations which form the single groove, but rather will consist of two separate currents each bearing a linear relationship to one of the two initial current modulations which caused this resultant groove.

A further object of my invention is to provide a phonograph pickup of the electromagnetic type capable of separating and resolving into its components the modulation of a record groove cut in both a lateral and vertical manner, which pickup has moving parts with a low mass to insure a wide range of frequency response.

A further object of my invention is to provide a phonograph pickup of the electromagnetic type capable of separating and resolving into its components the modulation of a record groove cut in both a lateral and vertical manner, which pickup has a simple construction and an easily removable stylus assembly.

The above objects and advantages of my invention can be best understood by reference to the following description of a presently preferred embodiment when taken in conjunction with the accompanying drawings, wherein.

Figures 1, 2:
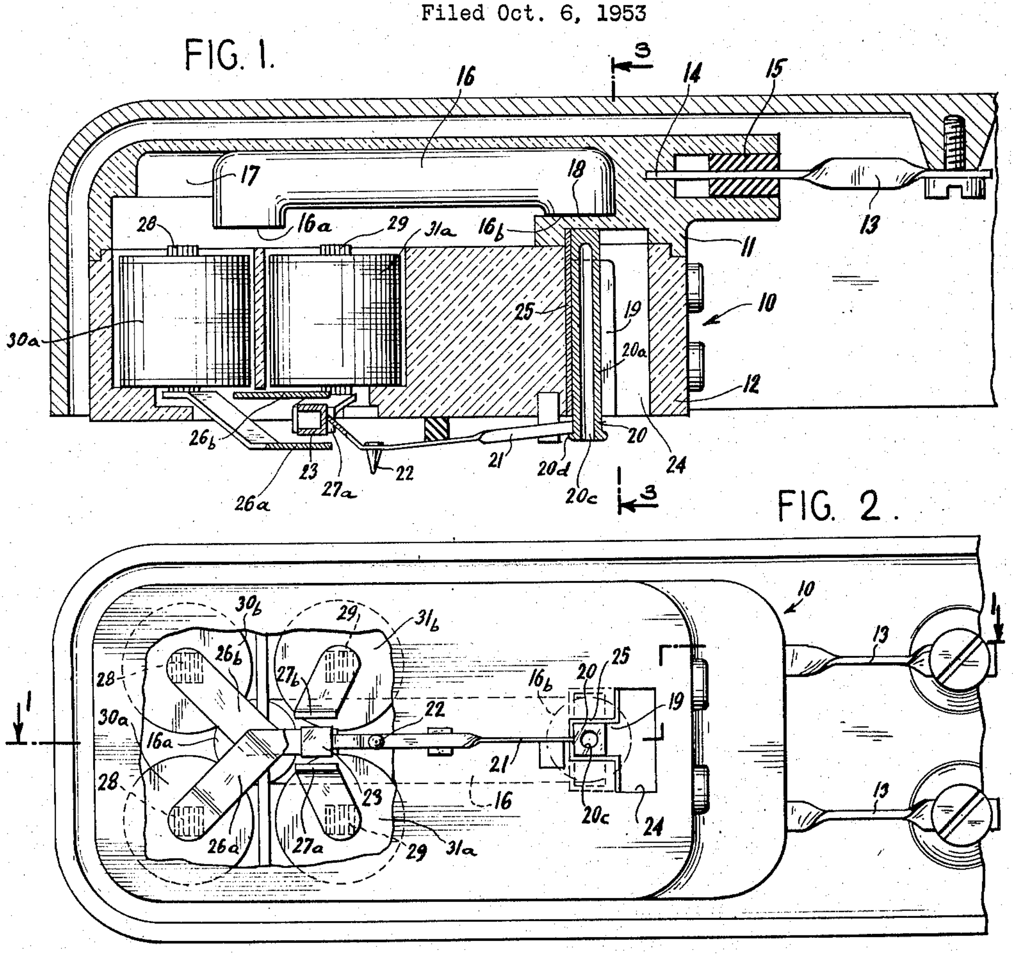
Fig. 1 is a side elevational view with parts sectioned, taken substantially along the line 1—1 of Fig. 2 and looking in the direction of the arrows, showing a binaural phonograph pickup embodying features of the present invention.
Fig. 2 is a bottom plan view of the binaural pickup of Fig. 1 with parts broken away for clarity.
Figure 3:
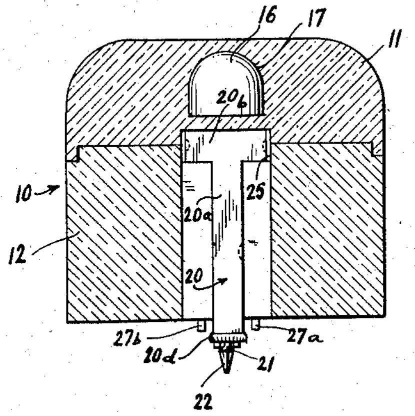
Fig. 3 is a sectional view taken substantially along the line 3—3 of Fig. 1 and looking in the direction of the arrows.

Briefly, the phonograph pickup illustrated has two generating elements, each comprised of a pair of coils in which a current is induced by the variation on the reluctance of a magnetic circuit which is composed of a small permanent magnet; a stylus holder and stylus support including a cantilever beam which has a vertical and lateral compliance, and which terminates in a cubical armature which extends beyond the stylus itself; four pole pieces which terminate in portions lying parallel to the two lateral and the two horizontal faces of the aforesaid cube, forming air gaps in the circuit whose width is varied by the motion of said cube; and two core pieces, each of which terminates in two of the four pole pieces, and each of which is common to one of the two generating coils.

With reference to the drawing, the pickup has a housing 10 which is composed of two interfitting sections, an upper section or cap 11 and a lower section or base 12, both molded from any suitable plastic and joined together by an appropriate adhesive substance, or through bonding of the plastic by the application of heat. These housing sections 11, 12 receive the operative elements of the pickup and are supported on the pickup arm by a suitable suspension seen to include a pair of springs 13 each having a right angle twist along its length and fastened at one end with an adhesive substance in the plastic cap 11 at the point 14 and the other end to the pickup arm by means of screws. These springs are suitably damped to eliminate low frequency vibration by the plugs or inserts 15 placed as shown.

The operative elements of the pickup are housed in the moulded bipartite casing. Specifically, a permanent magnet 16 having offset pole pieces **16*a* and 16*b* is fitted snugly into a recess 17 in the cap 11. The recess 17 is longer than the magnet 16 which it contains and has an opening at its bottom which is just long enough to admit the magnet and an enclosed end providing a supporting shoulder 18 for the magnet 16. In assembly, the magnet 16 is placed in the recess 17 and slid laterally into the enclosed end so that pole piece 16*b* lies above the supporting shoulder 18. The pole 16*b*, when in its final position overlies an upstanding passage 19 in the lower casing section 12**.

The passage or seat 19 extends into the moulded cap 11, which serves as a top for the passage and contains a generally upright holder or shaft 20 which is composed of a substance of high magnetic permeability and thus affords a path for magnetic flux. This shaft is part of a stylus assembly including a cantilever stylus support 21, a stylus 22 and an armature 23. The holder or shaft 20 is T-shaped and includes an upright **20*a* and a crossbar 20*b*. The crossbar 20*b* prevents the shaft from moving about its vertical axis, and also assures that the stylus assembly is properly oriented with respect to the pole pieces, when the T-shaped shaft 20 is seated in its proper position in its complementary T-shaped seat 19. Associated with the T-shaped seat 19 is a laterally-communicating entry passage 24, through which the T-shaped stylus holder 20 may be brought into side by side registry with the T-shaped seat prior to being displaced into its supported position beneath the pole face 16b. To facilitate removal and insertion of the stylus holder in its supported seat 19, the stylus holder 20 is provided with a vertical bore 20c, open at the bottom and extending within the upright 20a. The bore 20c is sufficient in cross-section to receive a thin instrument, such as a pin or needle which may be inserted into the bore to facilitate the transverse displacement of the stylus holder from its supported position of Fig. 1 into the entry passage whereupon the stylus holder 20 may be removed by grasping the flange 20d and withdrawing it vertically. The upward and forward path that the stylus holder 20 takes in being inserted into its final position automatically guides the armature 23** into its proper position between the two pairs of pole pieces, as will subsequently become apparent.

Within the seat or receptacle 19 for the stylus holder 20 there is provided a ferro-magnetic sheath or hood 25 serving to mechanically grasp and secure the T-shaped holder 20 in place and affording an additional path for the magnetic flux between the permanent magnet 16 and the cantilever support 21 of the stylus assembly. The sheath 25, which is fabricated of a spring-like material, mechanically grips the T-shaped holder 20, and also lessens the amount of flux passing through the holder. The latter facilitates ready removal of the stylus assembly for inspection, replacement and repair.

Figure 4:
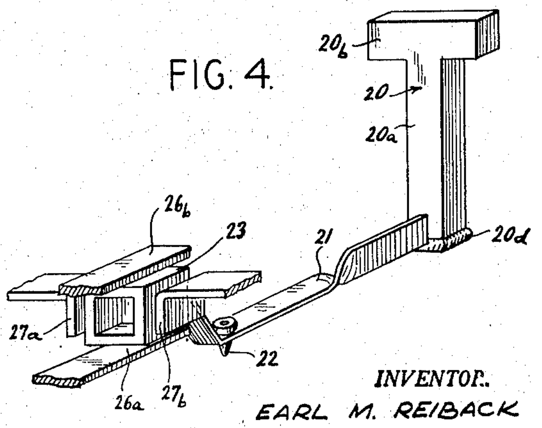
Fig. 4 is a perspective view, with parts broken away, showing the details of the stylus assembly and support.

The cantilever stylus support 21 extends from the base of the shaft or holder 20 and is composed of a high permeability, resilient alloy to afford a path for the magnetic flux. The cantilever support has a compliance which allows it to follow the composite vertical and horizontal undulation of the record groove and is suitably damped by appropriately placed damping material. The stylus 22 is attached to the cantilever stylus support adjacent to and spaced from the free end of the support. At its free end, the stylus support 21 carries the armature which is firmly connected to the stylus so that the motion of the stylus 22 is imparted directly to the armature 23. The armature 23 is in the shape of a rectangular parallelapiped, or cubical, having two pairs of parallel surfaces with one pair of surfaces being perpendicular to the other pair of surfaces. One of these pairs of surface is vertically positioned, while the other pair is horizontally positioned. The armature 23 is of a metal or alloy of high magnetic permeability and may be made fairly hollow so that the moving system will have a small mass to allow for a rapid response to high frequencies. This hollow armature has only five walls, the wall opposite the cantilever support 21 being removed, as seen best in Fig. 4.

The armature 23 is normally centered in an air gap formed between two pairs of pole pieces 26a, 26b and 27a, 27b respectively. These pole pieces extend from two core structures 28 and 29 which are mounted on the base housing section 12. Above these core structures is the pole 16a of the permanent magnet 16. The air gaps between the pole face 16a and the core structures are substantially equal. However, the air gap between the pole face 16a and the core structure 29 is slightly less than the corresponding air gap between the pole face 16a and the core structure 29 to compensate for employing longer pole pieces 26a, 26b in forming the vertical air gap, thus insuring an equal flux flow through both core structures 28, 29 when the armature 23 is centered between the two pairs of pole pieces. Each of the core structures is surrounded by a pair of series connected coils respectively designated as 30a, 30b and 31a, 31b. There is no electrical connection between the respective coil pairs. Appropriate leads, not shown, are provided from the respective coil pairs and connected to suitable amplifying means which in turn produce independent amplified signals for operating two separate, spaced speakers.

The phonograph pickup operates in substantially the following manner:

The stylus 22 of the stylus assembly is placed under a load of approximately one half ounce and tracks in a groove cut in such a way that the vertical, or hill and dale undulations of the groove carry one sound track, and simultaneously, the lateral undulations of the groove carry a different sound track. The two sound tracks may be related binaurally. The pickup, having separate electrical outputs from the respective coil pairs, will resolve the compound vertical and horizontal motion of the stylus into voltage variations in the two separate coils, the voltage variations in one coil corresponding to the vertical component of the stylus' motion and the voltage variation in the second coil corresponding to the horizontal component of the stylus' motion.

Specifically, the stylus is vibrated in both a vertical and lateral plane upon engagement with a sound record cut in the aforesaid manner, and this vibration is transmitted by the stylus support to the armature or cube 23. The cube 23 vibrates with respect to two pairs of pole pieces 26a, 26b and 27a, 27b. There is a magnetic flux circuit composed of the permanent magnet 16, the holder or shaft 20 of the stylus assembly, the cantilever spring 21 of the stylus assembly, and the cubical armature 23 at the termination of the stylus assembly.

This armature in vibrating with respect to the pole pieces 26a, 26b and 27a, 27b, changes the width of the air gaps between the armature and the respective pole pieces which causes the reluctance of the magnetic circuits through core pieces 28, 29 of the four coils 30a, 30b, 31a, 31b to be changed in accordance with this vibration, which, in turn, induces a current in the coils. The current thus caused in the coils is directly proportional, and linearly related to the velocity of the armature.

It can be seen that with the arrangement indicated, a lateral motion of the armature 23 will change the size of the air gaps between the pole pieces 27a, 27b and thus change the reluctance of the magnetic flux circuits through the core pieces 29, inducing a current in the coils 31a, 31b which are connected in series. However, this same lateral motion will not alter the width of the air gaps between the armature and the pole pieces 26a, 26b, and thus no current will be induced in the coils 30a, 30b as a result of this lateral motion.

Similarly, a vertical motion of the armature 23 will change the width of the air gaps between the armature and the pole pieces 26a, 26b, thus changing the reluctance of the magnetic flux circuits through the core pieces 28 and inducing a current in the coils 30a, 30b. However, this same vertical motion will not alter the width of the air gaps between the armature and the pole pieces 27a, 27b, and thus no current will be induced in the coils 31a, 31b as a result of this vertical motion.

Thus, the motion of the armature with respect to the four pole pieces distributes the magnetic flux in such a way as to separate the vertical components of the undulation of the groove from the lateral components of the same groove, and translates the vertical component of the groove and the lateral component of the groove into two separate electric currents which correspond to these separate groove components.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

What I claim is:

1. A phonograph pickup comprising a supporting member, first and second coil pairs mounted on said supporting member, each of said coil pairs including a common core structure having opposed pole pieces, means including a permanent magnet and the respective pole pieces of said coil pairs forming a magnetic path having vertical and horizontal air gaps, a stylus assembly in said magnetic path including an armature common to said vertical and horizontal air gaps, and means for mounting said stylus assembly for vibration in response to engagement with a single record groove having vertical and horizontal components, said vibration being translated to said armature to cause respective flux changes in said vertical and horizontal gaps in dependence upon said vertical and horizontal components of said single sound track, the flux changes in said vertical gap producing signals in the associated coil pair of a magnitude dependent upon said vertical component of said vibrations and the flux changes in said horizontal gap producing signals in the associated coil pairs of a magnitude dependent upon said horizontal component of said vibrations.

2. A phonograph pickup according to claim 1 wherein the means for mounting said stylus assembly includes a ferromagnetic suspension member removably received within a receptacle in said supporting member.

3. A phonograph pickup comprising a supporting member, a stylus assembly mounted thereon and including a single cantilever-supported stylus having both a vertical and lateral compliance, two pairs of coils each having a core structure terminating in pole piece arranged in pairs, an armature connected to said cantilever-supported stylus and forming a stylus assembly, the respective pairs of pole pieces and said armature being arranged to form magnetic paths with air gaps disposed in pairs horizontally and vertically, a permanent magnet, said permanent magnet and said core structure completing said magnetic paths, vibrations of said stylus assembly in response to engagement with a single record groove having simultaneous but dissimilar vertical and horizontal sound tracks impressed upon it being translated to said armature to cause flux changes in said air gaps in dependence upon said vertical and horizontal components of said single sound track.

4. A phonograph pickup comprising a supporting member, core structures having respective pairs of pole pieces mounted on said supporting member, a stylus assembly including a single stylus, a stylus support having a projecting resilient cantilever beam carrying said stylus, and an armature positioned on said beam at the end remote from said stylus support, said armature having two pairs of parallel surfaces with one pair of surfaces being perpendicular to the other pair of surfaces, said armature being positioned between said two pairs of pole pieces to form magnetic paths with paralleled air gaps which include a pair of vertical air gaps and a pair of horizontal air gaps, and means for producing magnetic flux in said magnetic paths, the means for producing magnetic flux and said core structures completing said magnetic paths, the dimensions of said paralleled air gaps being changed by the vibration of said armature in accordance with the vibrations of said single stylus riding in a record groove which has both vertical and lateral sound track components, thus causing corresponding flux changes in the magnetic circuits through said core structures, which flux changes induce a current in electrically isolated coils on the respective core structures.

5. A phonograph pickup comprising a supporting member, a stylus assembly mounted thereon and including a single cantilever-supported stylus having compliance in mutually perpendicular directions, two pairs of coils each having a core structure terminating in a pole piece arranged in pairs, an armature operatively connected to said cantilever-supported stylus and forming a stylus assembly, the respective pairs of pole pieces and said armature being arranged to form magnetic paths with air gaps disposed in pairs which are mutually perpendicular, a permanent magnet, said permanent magnet and said core structures completing said magnetic paths, vibrations of said stylus assembly in response to engagement with a single record groove having simultaneous but dissimilar mutually perpendicular sound tracks impressed upon it being translated to said armature to cause flux changes in said air gaps in dependence upon said mutually perpendicular components of said single sound track.

6. A phonograph pickup comprising a supporting member, core structures having respective pairs of pole pieces mounted on said supporting member, a stylus assembly including a single stylus, a stylus support having a projecting resilient cantilever beam carrying said stylus, and an armature positioned on said beam at the end remote from said stylus support, said armature having two pairs of parallel surfaces with one pair of surfaces being perpendicular to the other pair of surfaces, said armature being positioned between said two pairs of pole pieces to form magnetic paths with paralleled air gaps which include first and second pairs of air gaps which are mutually perpendicular, means for producing magnetic flux in said magnetic paths, the means for producing magnetic flux and said core structures completing said magnetic paths, the dimensions of said air gaps being changed by the vibration of said armature in accordance with the vibrations of said single stylus riding in a record groove which has mutually perpendicular sound track components, thus causing corresponding flux changes in the magnetic circuits through said core structures, which flux changes induce a current in electrically isolated coils on the respective core structures.

7. A variable reluctance phonograph pickup for use with a record having a single composite groove stereophonic recording, said groove being comprised of the vector sum of two separate modulations which lie along two mutually perpendicular coordinate axes with each modulation corresponding to one of two stereophonic channels of sound, said pickup comprising a support, a magnetic flux path including in sequence at least one permanent magnet, a stylus assembly and armature, two pairs of air gaps, two pairs of pole pieces, and two pairs of coil core structures, said armature being oriented between said two pairs of pole pieces and defining two pairs of air gaps between said armature and said two pairs of pole pieces, one pair of pole pieces being oriented at right angles to the other pair of pole pieces so that motion of said armature along a first coordinate axis will vary the dimensions of the air gaps associated with a first pair of coil core structures and pole pieces while not affecting the dimensions of the second pair of air gaps and motion of said armature along a coordinate axis at right angles to said first coordinate axis will vary the dimensions of the air gaps associated with the second pair of coil core structures and pole pieces while not affecting the dimensions of the first pair of air gaps, the coordinate axes of said pickup being the same as the coordinate axes of the separate modulations which form said composite single groove of said recording, said variation in the width of said air gaps causing the reluctance of said magnetic circuit through the first and second pairs of coil core structures to vary in accordance with the vector component of the stylus motion along each coordinate axis thus inducing currents in the first and second pairs of coils which correspond to the vector component of the stylus motion along the first and second coordinate axes respectively, said currents providing the stereophonic output of said pickup corresponding to the two separate mutually perpendicular modulations which formed said single composite groove.

8. A variable reluctance phonograph pickup for use with a record having a single groove stereophonic recording having two independent modulations representing groove displacements in two mutually perpendicular planes, the modulation in each plane corresponding to one of the two stereophonic channels of sound, said pickup comprising a supporting structure, a stylus assembly including a cantilever beam, a needle mounted in said beam for tracking in said groove, an armature mounted in said beam and movable in accordance with the movement of said beam, two pairs of coils with associated core structures and pole pieces including a first pair of pole pieces oriented so that the armature lies between them and further oriented so that the motion of said stylus in response to one of the two mutually perpendicular groove modulations alone will cause said armature to move between said first pair of pole pieces along the shortest line between the faces of said pole pieces and said armature, the motion of said armature varying the width of both air gaps between said armature and each of said first pair of pole pieces, the width of one air gap increasing by the same amount that the width of the other air gap decreases thus complementarily changing the reluctance of the two magnetic paths from said armature across said air gaps to said two pole pieces of said first pair of coil core structures, a second pair of pole pieces oriented at right angles to said first pair of pole pieces so that the motion of said stylus in response to the second of said two mutually perpendicular groove modulations alone will cause said armature to move between said second pair of pole pieces along the shortest line between the faces of said pole pieces and said armature, the motion of said armature varying the width of both air gaps formed between said armature and said second pair of pole pieces, the width of one air gap increasing by the same amount that the width of the other air gap decreases thus complementarily changing the reluctance of the two magnetic paths from said armature across said air gaps to said pole pieces of said second pair of coil core structures, the complete magnetic path including at least one permanent magnetic as the source of magnetic flux, said stylus assembly, said armature, said two pairs of air gaps, said two pairs of pole pieces, and said two pairs of coil core structures in that sequence, the independent variations in the magnetic flux through each pair of coil core structures causing two output currents to be generated in each pair of coils which provide the stereophonic outputs of this pickup.

9. A phonograph pickup for electrically resolving the motion of a stylus in two dimensions into voltage variations in two separate output circuits, the voltage variations in one circuit corresponding to the motion of the stylus along one axis, and the voltage variations in the second circuit corresponding to the stylus motion along a second axis which is perpendicular to the first said axis, said phonograph pickup comprising first and second pairs of core pieces, first and second pairs of output coils on said first and second pairs of core pieces, first and second pairs of pole pieces associated with said first and second pairs of core pieces, a stylus, an armature movable with said stylus, a magnetic circuit including in sequence a source of magnetic flux, said armature, first and second pairs of air gaps between said armature and said first and second pairs of pole pieces, said first and second pairs of pole pieces, and said first and second pairs of core pieces, said armature being arranged with respect to said pole pieces to form said air gaps such that motion of the stylus along one principal axis corresponding to the groove displacement along the one axis alone will vary the first pair of air gaps without affecting the second pair of air gaps and motion of the stylus along the second axis, perpendicular to the first axis, will vary the second pair of air gaps without affecting the first pair of air gaps, said pairs of air gaps being perpendicular to each other, the motion of the armature between each pair of pole pieces increasing the width of one gap of the pair while decreasing the width of the other thereby producing changes in reluctance which cause changes in the magnetic flux density in said core pieces of the affected pair and induces a current in the coils associated with said core pieces, a similar affect taking place independently in the second pair of coils in response to the independent motion of said armature between said second pair of pole pieces inducing a current in said second pair of coils, the currents from the first and second pairs of coils respectively providing the two channel stereophonic output of said pickup.

References Cited in the file of this patent

UNITED STATES PATENTS

| | | |
|---|---|---|
| 1,804,961 | Thomas | May 12, 1931 |
| 2,114,471 | Keller et al. | Apr. 19, 1938 |
| 2,456,388 | Cornwell | Dec. 14, 1948 |
| 2,511,663 | Bachman | June 13, 1950 |
| 2,554,696 | Bruderlin | May 29, 1951 |